Patented Apr. 24, 1923.

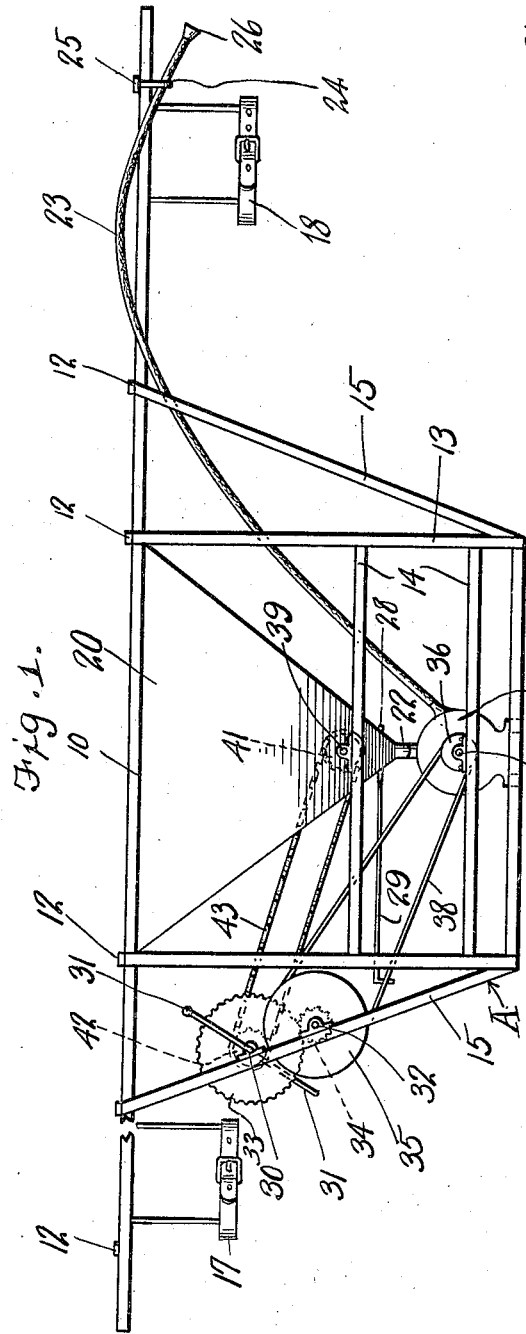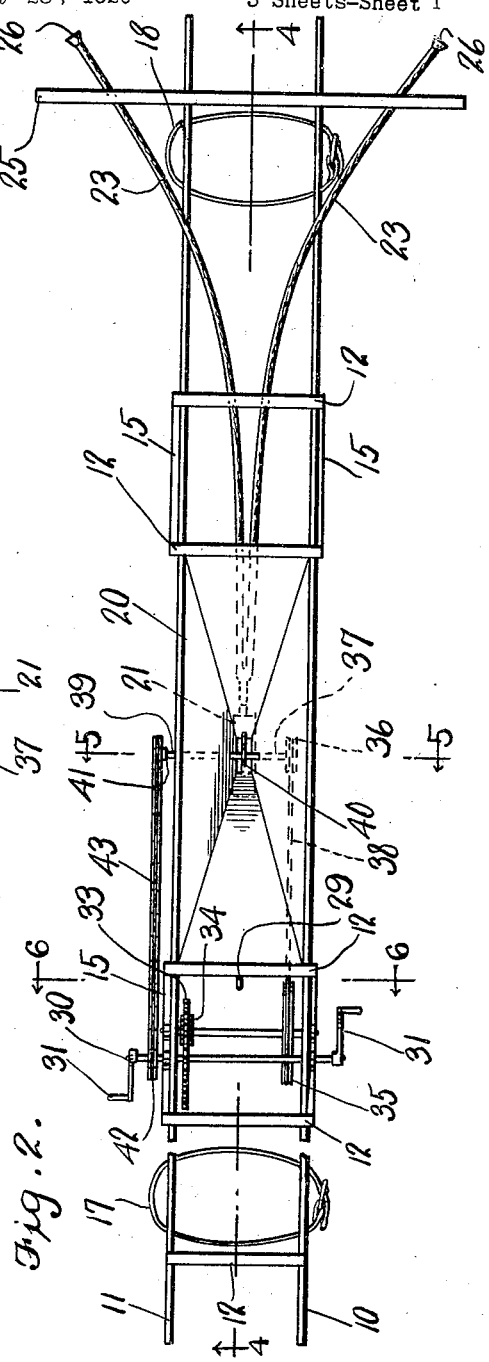

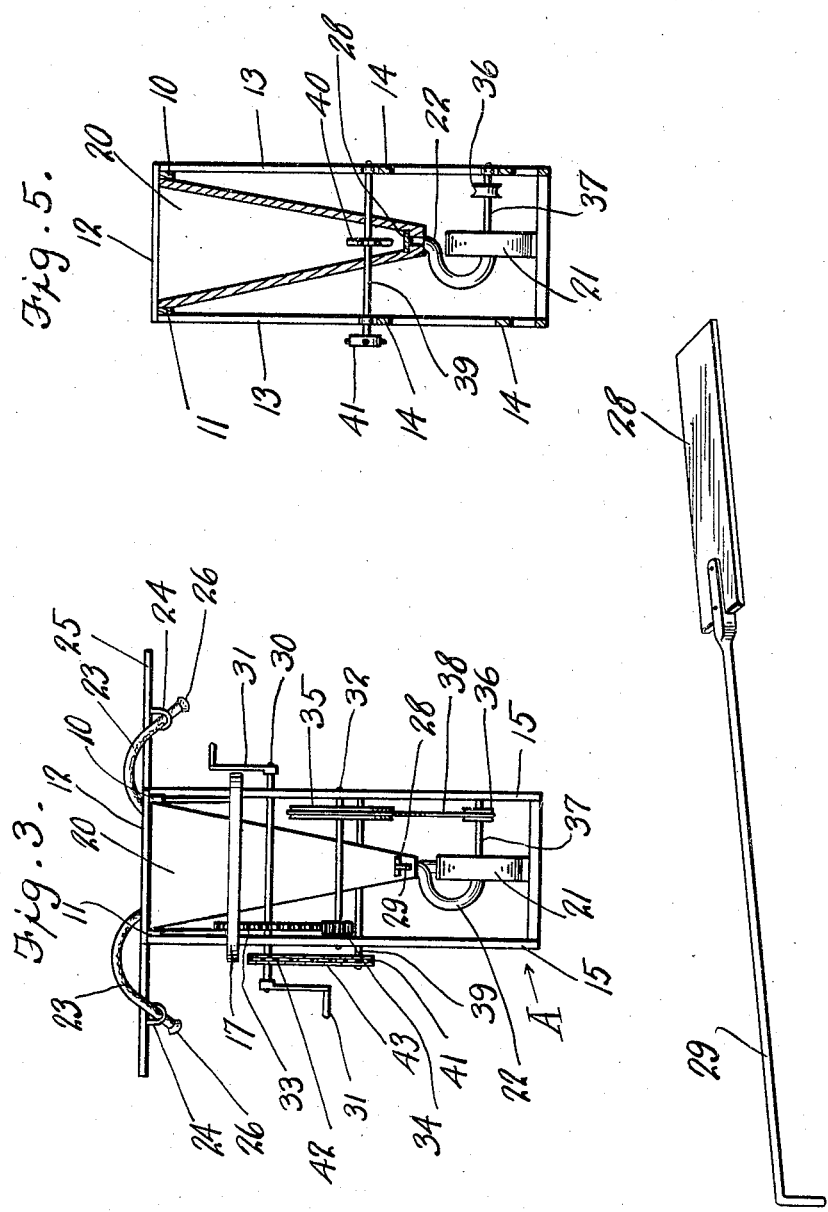

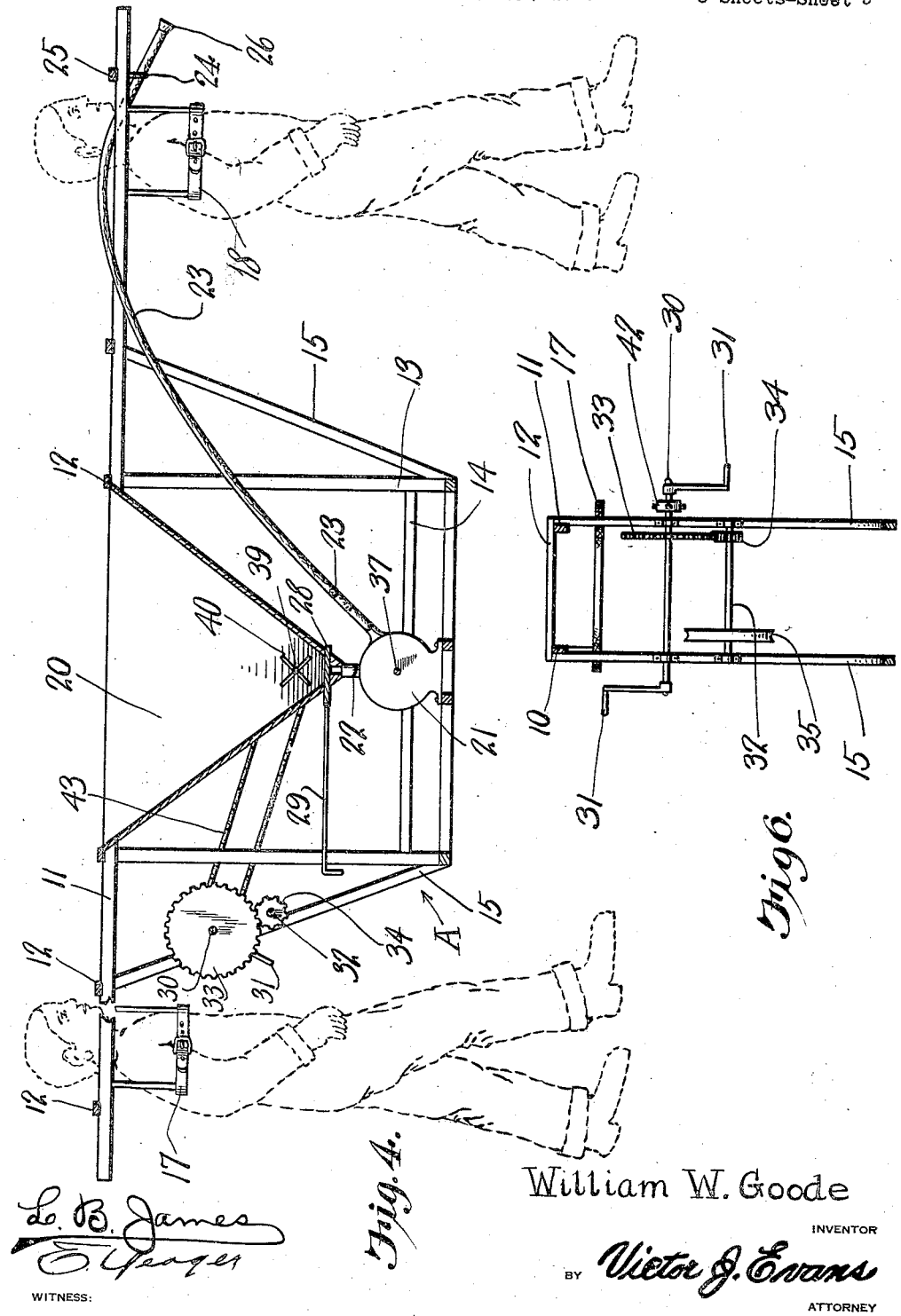

1,453,102

UNITED STATES PATENT OFFICE.

WILLIAM WILKINSON GOODE, OF ARLINGTON, ALABAMA.

POWDER DUSTER.

Application filed May 28, 1920. Serial No. 385,052.

*To all whom it may concern:*

Be it known that I, WILLIAM W. GOODE, residing at Arlington, in the county of Wilcox and State of Alabama, have invented new and useful Improvements in Powder Dusters, of which the following is a specification.

This invention comprehends the provision of a machine, designed to be carried upon the shoulders of the users, and adapted to distribute powder of a poisonous nature upon a number of rows of plants at the same time, with a view of poisoning or destroying the boll weevil or other insects.

One of the objects of the invention resides in the provision of a machine of the above mentioned character, which is extremely simple in construction, so that it can be manufactured and sold at a nominal cost, and consequently within reach of the average farmer, the machine being also very light to enable it to be easily and conveniently carried by the shoulders of two persons.

In carrying out the invention, I provide a manually operable fan or blower for forcing the poisonous substance from a suitable hopper, through a number of flexible conduits the latter being provided with spray nozzles at their ends, so that the poisonous substance is sprayed upon the plants to destroy boll weevil or other insects.

The nature and advantages of the invention will be better understood when the following detailed description is read in connection with the accompanying drawings, the invention residing in the construction, combination and arrangement of parts as claimed.

In the drawings forming part of this application like numerals of reference indicate similar parts in the several views, and wherein:

Figure 1 is a side elevation of the machine constructed in accordance with my invention.

Figure 2 is a top plan view of the same.

Figure 3 is a rear end elevation.

Figure 4 is a longitudinal sectional view taken on line 4—4 of Figure 2.

Figure 5 is a transverse sectional view taken on line 5—5 of Figure 2.

Figure 6 is a similar view taken on line 6—6 of Figure 2.

Figure 7 is a detail view of the valve controlling the discharge of the substance from the hopper.

The machine forming the subject matter of my invention comprises a frame like structure adapted to be carried upon the shoulders of two persons. Consequently, the frame includes spaced parallel members 10 and 11 respectively, which may be of any suitable length and constructed from any suitable material, these members being connected together by transverse strips 12. Depending from the members 10 and 11 at a point approximately midway between the ends of said members is a substantially rectangular frame-like structure indicated generally at A, and including corner uprights 13 connected by transverse members 14. The frame A is braced by the reinforcing elements 15 which are connected with the corners of the frame A and with the members 10 and 11 respectively. Connected with the members at the opposite end of the frame and adapted to surround the bodies of the persons supporting the machine, and suspended from the members 10 and 11 are straps 17 and 18 adapted to go around the shaft and back of the user. The straps 17 and 18 at the opposite ends of the frame serve to support the machine upon the shoulders of the two persons using the same in a manner that will not require the use of the hands of the persons to prevent the machine from slipping or moving laterally upon the shoulders.

Arranged within the frame A is a hopper 20 which may be of any desired capacity, and which hopper contains the powder or other poisonous substance with which the plants are to be sprayed. Carried by the frame A immediately beneath the hopper 20 is a fan or blower 21 which communicates with the bottom of the hopper by means of a pipe 22 and projecting from the fan or blower 21 is a plurality of flexible conduits 23, the latter projecting in the direction of the forward end of the frame and supported in flexible loops 24 suspended from a cross rod 25 connected to the parallel members 10 and 11. The poisonous substance gravitates into the fan or blower 21, and is forced therefrom through the flexible conduits 23, at the outer ends of which nozzles 26 are provided so that said substance is sprayed over the plants for the purpose hereinabove mentioned. The conduits 23 can be flexed so as to spray the poisonous substance in any desired direction, it being apparent that the weight of these conduits is borne by the loops 24. The slide valve 28 controls the communication between the hopper 20 and the pipe 22 of the fan 21, and this valve is equipped with a rod 29 which is disposed within convenient reach of one of the operators.

A drive shaft 30 is journaled in the members 10 and 11, the opposite ends of this shaft being equipped with crank handles 31 extending in opposite directions, through the instrumentality of which the shaft 30 is rotated. A counter shaft 32 is mounted for rotation with and arranged in parallelism with the shaft 30. A larger gear 33 is fixed upon the drive shaft 30, connected with a small gear 34 fixed upon the counter shaft 32, so that the latter mentioned shaft is rotated by the drive shaft 30. A pulley 35 is carried by the counter shaft 32, and over this and a pulley 36 carried by the fan shaft 37 is trained an endless belt 38 which drives or operates the fan upon rotation of the drive shaft 30. A shaft 39 is journaled upon the frame A, this shaft being passed through the hopper 20 and carrying an agitating element 40 which when rotated aids the poisonous substance in dropping from the hopper through the outlet opening in the bottom thereof. The shaft 39 projects beyond one side of the frame and is fitted with a sprocket 41. Over this sprocket and a sprocket 42 carried by the drive shaft 30 is trained an endless chain 43 for imparting rotation to the shaft 39 as will be readily understood.

In practice, the members 10 and 11 of the machine are supported upon the shoulders of two persons arranged one behind the other, and the machine held thereon by means of the straps 17 and 18 respectively. The person supporting the rear end of the machine operates the crank handles 31 in order to rotate the drive shaft 30 from which the fan 21 and the agitating element 40 are actuated in the manner above described. The valve operating rod 29 is disposed in convenient reach of this person and consequently the valve can be regulated to permit of the discharge of any particular quantity of the poisonous substance from the hopper 20 to the fan casing 21. As the shaft 30 is rotated, the poisonous substance passes from the hopper 20 into the fan casing, the fan in turn forcing this substance through the flexible conduits 23 to be sprayed through the nozzles 26 upon the plants as above described. The supporting structure as well as the other parts of the machine are as light as possible, so as to be conveniently carried upon the shoulders of the users. It will be further noted that the flexible conduits 23 may be flexed and arranged in any desired position to direct the spray or they may be conveniently handled for this purpose by the person supporting the machine at the forward end thereof. The construction and arrangement is such, that the velocity of the poisonous substance leaving the fan will not in anyway affect the distribution which will be equal in each and every one of the conduits employed.

While from the foregoing description the nature and advantages of my device will be apparent, I desire to have it understood that I do not limit myself to the details of construction herein shown and described, as such changes may be resorted to when desired as fall within the scope of what is claimed.

Having described the invention what is claimed is:—

1. A powder duster comprising a supporting structure having spaced horizontal members forming shoulder-straddling supports and a frame depending from the said members approximately from a point intermediate opposite ends thereof, and powder distributing means supported in the depending frame, said means being operable from one end of the frame and directed in operation from the other end.

2. A powder duster comprising a supporting frame, powder spraying means supported in said frame, shoulder bars at the front and rear of the frame for projections across the shoulders of the carriers, and body-embracing straps depending from each pair of shoulder bars.

3. A powder duster comprising a carrying structure including a relatively vertical frame and horizontal carrying members projecting beyond opposite sides of the frame to provide shoulder-straddling bars adjacent the upper end, a powder spraying mechanism supported in said frame and including flexible sprayers, means operable from one side of the frame for actuating the spraying mechanism, and loops depending from the shoulder bars on the opposite side of the frame for supporting the nozzle ends of the said flexible sprayers.

4. A powder duster comprising a powder spraying mechanism, a pair of inflexible members presenting a support from which the said spraying mechanism is suspended, said members being extended beyond the same to provide shoulder-straddling-extensions, and body-encircling straps depending from the said extensions for securing the latter in position upon the shoulder.

In testimony whereof I affix my signature.

WILLIAM WILKINSON GOODE.